United States Patent [19]
Fleischhacker et al.

[11] 3,818,766
[45] June 25, 1974

[54] LIQUID MANOMETER
[75] Inventors: Joseph F. Fleischhacker, Minnetonka; Lindsay A. Wallace, Minneapolis, both of Minn.
[73] Assignee: Tescom Corporation, Minneapolis, Minn.
[22] Filed: Oct. 25, 1972
[21] Appl. No.: 300,786

[52] U.S. Cl. ............................................. 73/406
[51] Int. Cl. ............................................. G01l 7/08
[58] Field of Search ........ 73/406, 401, 146.8, 146.3

[56] References Cited
UNITED STATES PATENTS
| | | | |
|---|---|---|---|
| 836,874 | 11/1906 | Feather | 73/401 |
| 1,442,134 | 1/1923 | Dunajeff | 73/401 |
| 1,490,036 | 4/1924 | Sheppard | 73/406 |
| 1,692,360 | 11/1928 | Wolcott et al. | 73/406 |
| 2,417,449 | 3/1947 | Rubin | 73/146.8 |
| 2,577,100 | 12/1951 | Alvarez | 73/406 |

*Primary Examiner*—Donald O. Woodiel
*Attorney, Agent, or Firm*—Dugger, Johnson & Westman

[57] ABSTRACT

A liquid manometer or pressure indicator having a housing with spaced indicia thereon, a sensing gland joined to the housing and having a chamber for liquid opening to the housing bore, a metal disk secured to the gland end surface that is opposite the housing and a rod extending within said chamber and bore, and a pressure regulator having the housing threadedly connected thereto. In the second embodiment the housing bore is tapered while in the third embodiment the housing bore is of a stepped construction.

4 Claims, 4 Drawing Figures

PATENTED JUN 25 1974  3,818,766

LIQUID MANOMETER

BACKGROUND OF THE INVENTION

A liquid manometer. Prior art pressure gauges that are used to give an indication of the pressure of a fluid in a container for example, those having a pointer that through a spring moved between various angular positions depending on the pressure being measured are relatively expensive to make. In order to overcome the above mentioned problem, as well as others, this invention has been made.

SUMMARY OF THE INVENTION

A liquid manometer having a housing with an elongated bore and a resilient pressure sensing and liquid storage element secured to the housing. Preferably a wire or rod is provided in the bore and chamber, or the housing bore is tapered, while for higher pressure ranges, a metal disk may be attached to pressure sensing element remote from the housing.

BRIEF DESCRIPTION OF THE DRAWINGS

Referring to FIG. 2 of the drawings, the liquid manometer or pressure indicator, generally designated 10, of the first embodiment of this invention includes an elongated, rigid, transparent housing 11. The housing has a polysided nut end portion 11a; an opposite, externally threaded end portion 11b; and an intermediate portion 11c that is provided with spaced indicia 12. In the threaded end portion 11b there is provided a bore having a bore portion 14 and part of an elongated bore portion 15 that at one end opens to bore portion 14. Bore portion 15 extends through the intermediate portion 11c and is closed at the end opposite bore portion 14. Bore portion 15 is of a substantially smaller diameter than bore portion 14, the intersection of said bore portions providing an annular shoulder.

Figure 1:
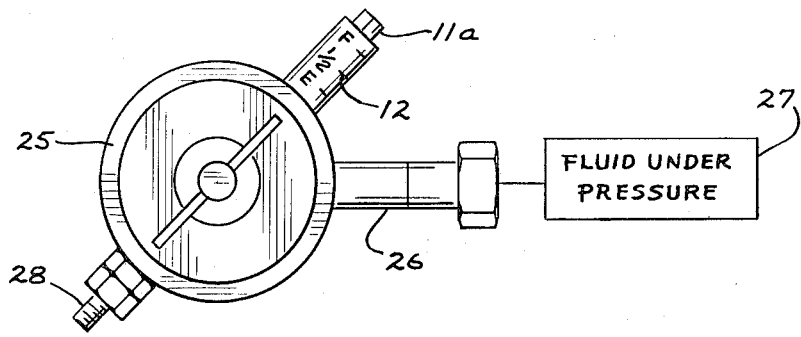
FIG. 1 is a front view of a manometer of this invention mounted on a pressure regulator.

A resilient gland (pressure sensing element) 16, for example made of rubber, has a tubular portion 16a, an end wall 16b joined to one annular edge of tubular portion 16a, and an axially extending annular flange 16c that is joined to the opposite annular edge of portion 16a whereby there is provided a liquid chamber 17. The outer diameter of the annular flange is such that the outer flange wall forms a close fit with the circumferential wall of bore portion 14 while the inner diameter of the flange is substantially larger than bore portion 15. The annular flange 16c is of an axial length to have the terminal annular edge thereof abut against the shoulder of the housing at the juncture of bore portions 14 and 15, and the annular shoulder of the gland at the juncture of flange 16c and tubular portion 16a abut against the terminal annular edge of the housing threaded end portion. The adjacent surfaces of the gland and housing are bonded to one another in a hermetically sealed relationship.

A rigid disk 18 of metal or plastic that is of a diameter greater than that of bore 14, and desirably of the same diameter as that of portions 16a, 16b, is bonded to the surface of end wall 16b that is remote from the tubular portion 16a. The minimum diameter of the threads of the threaded portion 11b is greater than the outer diameter of tubular portion 16a and the diameter of disk 18.

An elongated element 19, for example a rod or a piece of wire, of a substantially smaller diameter than bore portion 15 is provided in bore portion 15 and chamber 17. The length of element 19 is nearly as great as the combined axial lengths of bore portion 15 and chamber 17.

As a result of providing the rod, any bubbles formed in bore portion 15 as liquid is forced into said bore portion are dissipated; i.e. the liquid travels down the rod due to capillary attraction, thus displacing the bubbles. As a result, in using the manometer there can be no stationary bubble in bore portion 15 that separates the liquid in said bore portion into two columns.

The chamber 17 is filled with a suitable liquid 24. If the liquid is colorless, than preferably a suitable dye is added to the liquid. In addition to adding a dye or in place of adding a dye there may be provided a base liquid, and a second liquid that is colored and of a lower density than the base liquid that may be "floated" on the base liquid to provide a visible floating indicator. Where the manometer is to be used to sense the pressure of, for example, high pressure oxygen, it is preferred that an inert liquid be used such as a perflorinated liquid.

Figure 3:
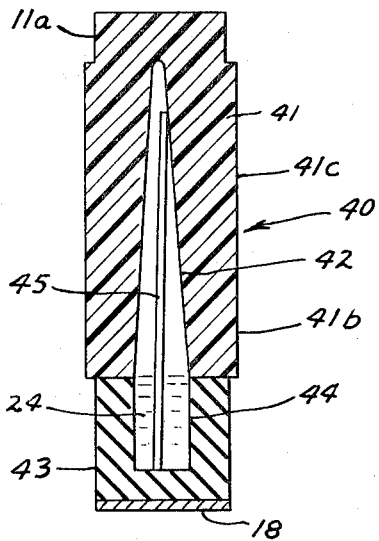
FIG. 3 is a longitudinal cross-sectional view of a manometer of the second embodiment of this invention.

Referring to FIG. 3 of the drawings, the second embodiment of this invention, generally designated 40, includes an elongated, transparent housing 41 having a nut end portion 11a, and an intermediate portion 41c that is provided with spaced indicia 12, and an opposite end portion 41b. In the housing there is provided an axially elongated, tapered bore 42 that opens through the adjacent terminal end surface of end portion 41b of the housing and is of a substantially larger cross-sectional area at said terminal end surface than at the opposite end of the housing. Hermetically secured to said terminal end surface of the housing is a resilient gland 43 that is closed at the end opposite the housing and has a cylindrical bore 44 therein that opens to bore 42. Preferably bore 44 has a diameter that is substantially the same as the maximum diameter of bore 42. Although not essential, in many situations a thin, axially elongated rod 45 may be provided in bores 42, 44 for the purpose as rod 19 is provided in the first embodiment. The bore 44 is filled with a suitable liquid 24.

A disk 18 that is of a greater diameter than bore 44 is bonded to the end wall of the gland that is remote from the housing.

Figure 4:
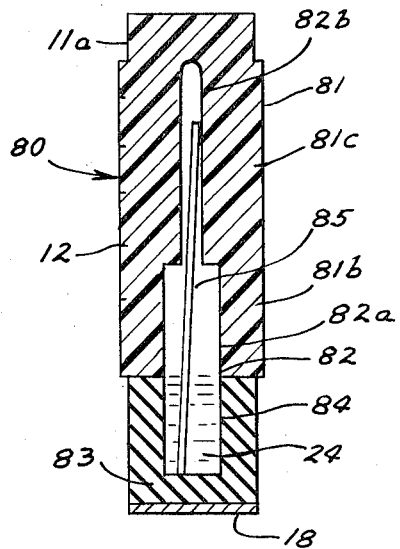
FIG. 4 is a longitudinal cross-sectional view of a manometer of the third embodiment of the invention.
Figure 2:
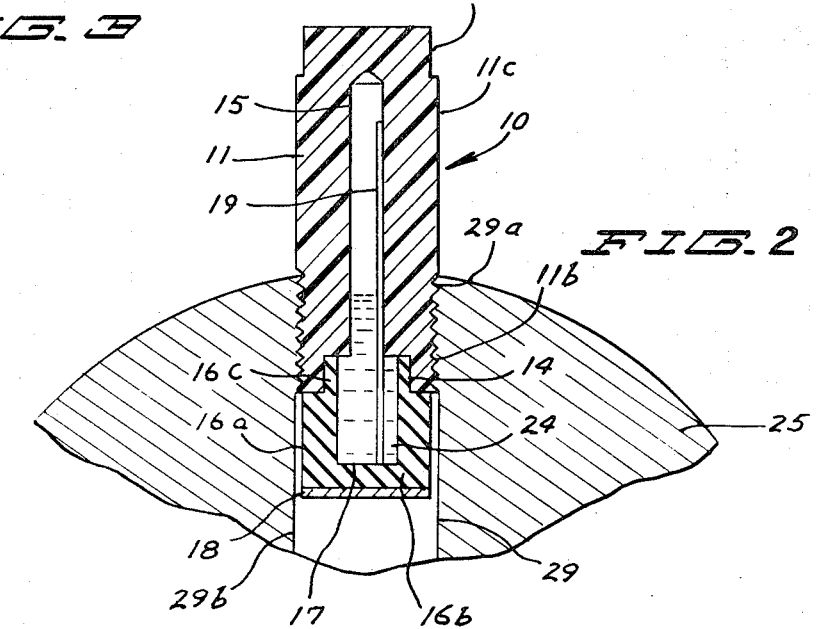
FIG. 2 is a longitudinal cross-sectional view of a manometer of the first embodiment of this invention and an adjacent part of the pressure regulator.

Referring to FIG. 4 of the drawings, the third embodiment of this invention, generally designated 80, includes an elongated, transparent housing 81 having a nut end portion 11a, and an intermediate portion 81c that is provided with spaced indicia 12, and an opposite end portion 81b. In the housing there is provided an axially elongated bore 82 that opens through the adjacent terminal end surface of end portion 81b of the housing and is of a substantially larger cross-sectional area at said terminal end surface than at the opposite end of the housing. Hermetically secured to said terminal end surface of the housing is a resilient gland 83 that is closed at the end opposite the housing and has a cylindrical bore 84 therein that opens to bore 82 at bore portion 82a. That is, bore 82 has an axially elongated cylindrical bore portion 82a that opens to cylindrical bore 84 and an axially elongated cylindrical bore portion 82b that opens to bore portion 82a opposite bore 84. Bore portion 82b is of a substantially smaller diameter than bore portion 82a. Indicia 12 is provided on the housing radially outwardly of each of bore portions 82a, 82b. Preferably bore 84 has a diameter that is substantially the same as the diameter of bore portion 82a. It is to be understood that one or more stepped bore portions may be provided in the housing of diameters intermediate those of bore portions 82a, 82b. Additionally, for some uses, for example, where more accuracy is required in reading the changes in pressure at the lower end of a pressure range that the upper end, bore portion 82a advantageously is of a smaller diameter than bore portion 82b. In such a case, to facilitate making the housing, end portion 11a would include a plug (not shown) for closing the adjacent end of the bore. Although not essential, in many situations a thin, axially elongated rod 85 may be provided in bores 82, 84 for the same purpose as rod 19 is provided in the first embodiment. The bore 84 is filled with a suitable liquid 24.

A disk 18 that is of a greater diameter than bore portion 82a may be bonded to the end wall of the gland that is remote from the housing.

The third embodiment is particularly useful where the degree of change of pressure at the lower end of a pressure range is not of as great an interest as that at the higher end of the range.

For many uses, end portion 21b or end portion 81b may be threaded as indicated for portion 11b, but other uses, none of the first, second and third embodiments require such threads.

By using a housing having a tapered bore to be of progressively increasing cross-sectional areas in a direction toward the sensing element and a liquid having a sufficiently low surface tension that the liquid does not lock in the end of the bore remote from the sensing element, the rod or wire 45 is not needed.

In place of a rubber gland, a bellows that is closed other than for an aperture may be used. In such a case, the bellows would be hermetically secured to the housing with the bellows aperture opening to the housing aperture and the liquid 24 would be in the bellows chamber.

The manometer of this invention may be used with, for example, a conventional pressure regulator 25 that has an inlet 26 connected to a source of fluid under pressure 27, an outlet 28 and a passageway 29 that opens to the passageway (not shown) between the inlet and outlet. Passageway 29 has a threaded portion 29a with threads that form a matching fit with the housing threads and a bore portion 29b of a substantially greater diameter than that of wall 16b and tubular portion 16a.

In using the manometer of the first embodiment of this invention (or second or third embodiment if the housing thereof has external threads), the housing is threaded into a suitable mounting member, for example a pressure regulator, so that the resilient gland tubular portion is surrounded by the media that is to have its pressure sensed. The mounting member is positioned such that the bore portion 15 is inclined upwardly (or extends vertically) to extend to a higher elevation than chamber 17.

When the manometer is in a vertical upright position with chamber 17 below bore portion 15, and the gland in an environment at atmospheric pressure, the level of liquid in bore portion 15 is closely adjacent the lowermost indicia on the housing. Upon exposing the resilient gland to a higher pressure, the volume of chamber 17 is decreased whereby the liquid raises to a higher level in bore portion 15.

As another example of the use of this invention, any one of the embodiments may be completely immersed in the fluid in a closed container with the housing bore extending to a higher elevation than the sensing element to measure the absolute pressure of the fluid in the container, assuming the container was made of transparent material or had a transparent window through which the pressure indicator 10, or 40, or 80 could be observed.

With reference to the pressure indicator of this invention, there is no definite relationship between the pressure inside the bores and that exterior to the indicator. That is, due to the resiliency of the sensing element, the exterior pressure may be considerably higher than the inside of the indicator. The internal pressure is dependent only on the volume of liquid displaced, not on the external pressure being sensed.

By making a rubber gland of varying durometer hardnesses, the pressure range of the manometer may be varied. For lower pressure ranges, the metal disk need not be used. However for higher pressures, the bonding of the disk to the gland permits a larger capacity chamber being provided in the gland than if the disk were not used, and prevents inversion of the gland. Also the disk provides a safety feature in that if the housing has a part broken off so that bore portion 15 opens to the atmosphere and the gland is forced (extrudes) through bore portion 15, the disk moves to abut against the housing to block substantial discharge of fluid through bore portion 15.

If the manometer is to be used to sense the change of pressure in a range of, for example 1,000 to 2,000 p.s.i. than it may be constructed such that liquid level is closely adjacent the lowermost indicia when the gland is in a fluid environment at 1,000 p.s.i.

Through the use of sensing elements of appropriate sensitivity and corresponding appropriate bore configurations, the pressure indicator of this invention can have an expanded scale at either a high pressure or a low pressure. For example the indicator may be used to indicate when a cylinder is nearly empty of liquid carbon dioxide. Usually the pressure of liquid carbon dioxide is about 800–1,000 p.s.i. from the time the cylinder is filled until nearly empty and then drops off sharply. In such a case the pressure indicator scale would have only a very small portion of the scale to indicate pressures up to 500 p.s.i. while the remainder of the scale would have spaced indicia for indicating pressures between, for example, 500–1,200 p.s.i. The third embodiment as illustrated in FIG. 4 is advantageously used where there is a greater interest in the change of pressure at the high end of a pressure range than at the low end of said pressure range.

Advantageously the housing may be made out of a high density, clear plastic sold under the proprietary name of Lexan.

As an example of the invention and not as a limitation thereto, the axial lengths of bore portions 14 and 15 may be respectively 0.12 inch and 0.84 inch; the axial length of chamber 17, 0.37 inch; the diameter of chamber 17, 0.19 inch; and the diameter of bore portion 15, 0.081 inch. However it is to be understood for some uses the housing may be a flexible tube of any desired length.

What is claimed is:

1. A pressure indicator comprising an axially elongated housing having a first end portion, said housing having an axially elongated bore that opens through only said first end portion and spaced indicia along the length of the bore, a resilient sensing element having an end wall and a chamber for containing a liquid, said element being secured to said end portion with the chamber opening to said bore and the end wall on the opposite side of the chamber from said bore, a liquid in said chamber, and an elongated rod extending in said chamber and said bore, said rod being of a substantially smaller diameter than said bore and of a length at least as great as the major part of the length of said bore, said bore having an elongated first part of a given diameter and a second part in said first end portion of a substantially larger diameter than said given diameter, and said element including an annular flange extending into said second part and that said chamber is of a diameter substantially larger than the diameter of said bore first part.

2. The apparatus of claim 1 further characterized in that a metal disk is bonded to said end wall, said disk being of a diameter greater than the diameter of said chamber.

3. The apparatus of claim 2 further characterized in that said element is a gland made of rubber and that said liquid is a perflorinated liquid.

4. A pressure indicator comprising an elongated, transparent housing having an elongated bore opening through one end portion thereof, and closed at the other end portion, a resilient pressure sensing element having a chamber for containing liquid, said element being hermetically secured to said housing to have the chamber in liquid communication with said bore, liquid in said chamber, said element comprising a resilient gland having an end wall and said chamber, said gland being secured to said one end portion with the bore opening to said chamber and the end wall on the opposite side of the chamber from said bore, and a rigid disk bonded to said end wall on the opposite side of the chamber from said bore, said disk being of a larger diamter than the diameter of the bore opening to the chamber, said one end portion having external threads and said disk being of a smaller diameter than the minimum outside diameter of the threaded end portion.

* * * * *